Dec. 15, 1936.　　　C. S. HAZARD　　　2,063,892
LIQUID WEIGHING DEVICE
Filed March 4, 1936
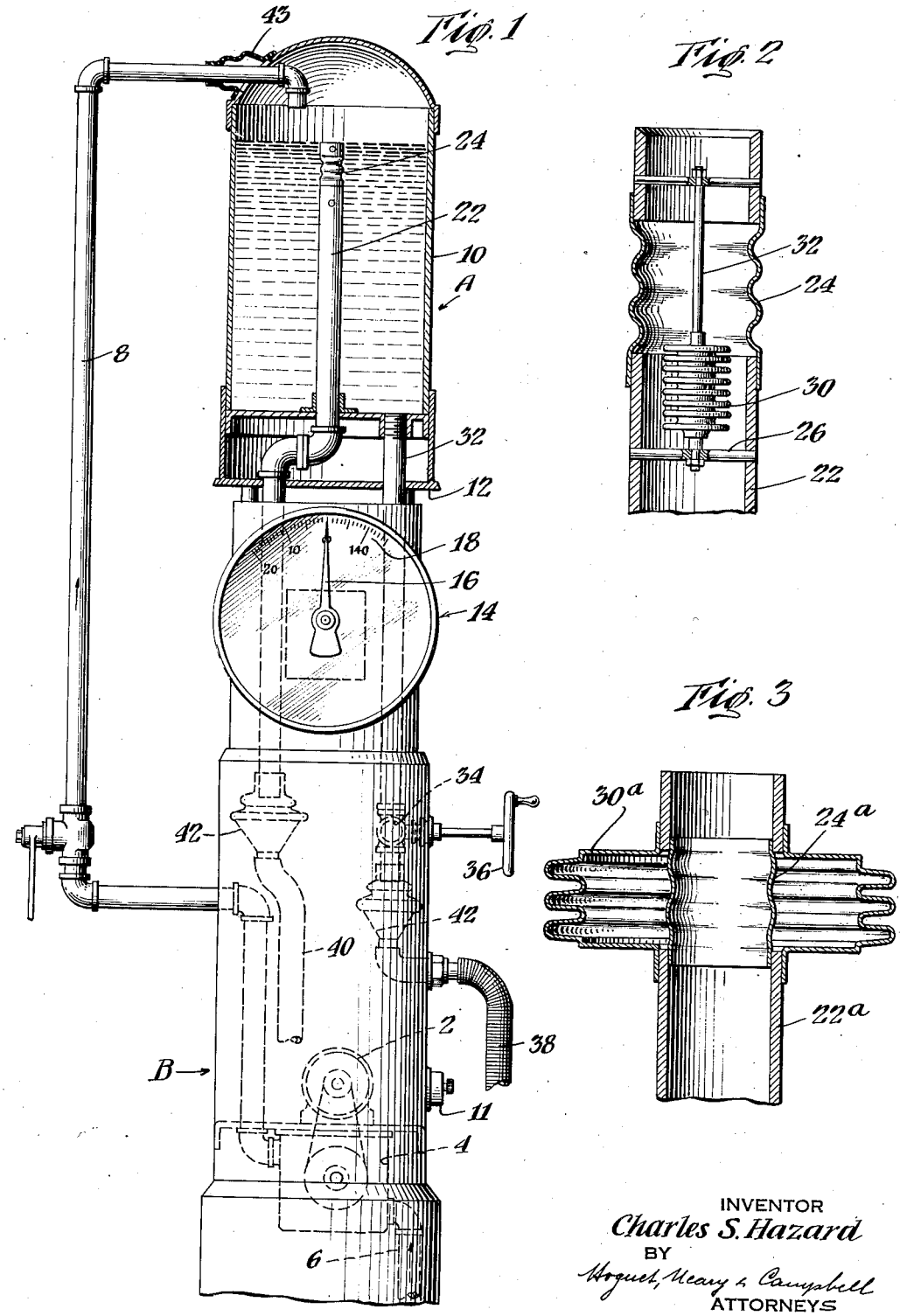
INVENTOR
Charles S. Hazard
BY
Hoguet, Neary & Campbell
ATTORNEYS Patented Dec. 15, 1936

2,063,892

UNITED STATES PATENT OFFICE 2,063,892

LIQUID WEIGHING DEVICE

Charles S. Hazard, New York, N. Y., assignor to Neptune Meter Company, a corporation of New Jersey Application March 4, 1936, Serial No. 67,036

13 Claims. (Cl. 221—100)

The present invention is directed to a device for dispensing a liquid by weight.

The liquid dispensing devices in current use, especially gasoline pumps are generally arranged to dispense the fluid gasoline by volume. These devices generally are either of the visible bowl type or the meter type. In the visible bowl dispensing devices the gasoline is delivered from a source of supply to a calibrated glass tank which is visible to the customer, and from which the liquid may be drained in any desired fraction of the total volume. In the meter type of dispensing device, a pump delivers the gasoline from a source of supply through a meter provided with an indicator for registering the quantity of liquid dispensed.

Both of these current types of liquid dispensing devices have been developed to a point where they are accurate so far as measurement of the liquid by volume is concerned, but both fail in the ultimate object of delivering units of gasoline each having the same energy-producing capacity. For example, a given gasoline has the same B. t. u. content for each unit of weight but not always for the same unit of volume, because, having a relatively high coefficient of expansion, gasoline has less weight per gallon at relatively high temperature than at low temperature, and consequently a gallon of gasoline at, say, 80° F. has less energy content than a gallon of the same gasoline at, say, 40° F. The same error arises with other liquids but to a different degree.

In accordance with the present invention, a liquid dispensing device, particularly adapted for dispensing gasoline, is provided, which dispenses the liquid by weight rather than by volume, thus avoiding errors which arise through change of temperature and such dispensing is performed semi-automatically in accordance with requirements, compensation being provided for changes in volume resulting from changes in temperature by means of an expansible chamber, which varies in capacity with the temperature and thus is capable of receiving, when full, a predetermined weight of liquid, regardless of its variation in volume.

More specifically, the device consists of a means for delivering liquid to a chamber, scales for weighing the liquid in the chamber, and a scale indicator which will register a predetermined figure when the chamber is full. The indicator is constructed so that the predetermined maximum figure is "zero" when the chamber is filled, and when liquid is dispensed, the indicator registers the weight of liquid dispensed, rather than the weight of the liquid remaining in the chamber. This is of great advantage in dispensing liquid, because it is possible to read directly from the indicator the quantity of liquid dispensed. To compensate for changes in volume of the liquid, per unit of weight, so that the chamber will always contain the same weight of liquid and the indicator will return to zero when the chamber is full, means have been provided for varying the capacity of the chamber in accordance with the change of volume of the liquid resulting from variations in temperature. Thus the chamber will have a less capacity at a low temperature than it does at a higher temperature, but in each instance, the weight of liquid contained therein will be the same. Specifically the capacity of the chamber is varied by means of a thermally responsive element which varies the length of an overflow pipe.

For a more complete understanding of the invention, reference may be had to the accompanying drawing, in which:

Figure 1 is an elevation of a dispensing pump embodying the invention;

Figure 2 is an enlarged axial section of the variable length overflow pipe, and

Figure 3 is a sectional view of a modification of the overflow pipe.

The liquid dispensing device indicated generally as A consists of a housing and framework B in which is supported in any desired manner, a motor 2, a pump 4, for delivering liquid through conduits 6, 8 from the usual source of supply (not shown) to a bowl 10, which may be glass for visibility or have a gage glass or the like. The motor is controlled by switch 11 on housing B. The bowl 10 is supported on a scale platform 12 connected to a scale 14 of any desired type. The scale is provided with an indicating hand 16, which is movable over the dial 18, calibrated into weight indications from zero to 150 pounds.

The dial 18, contrary to the usual scale dials is numbered in a counterclockwise manner, so that when the bowl 10 is full, the hand 16 indicates zero on the dial.

The purpose of this arrangement of the dial 18 is to indicate the weight of liquid dispensed from the bowl 10 rather than the weight of the liquid in the bowl. As the liquid is dispensed, the hand 16 moves away from zero in accordance with the difference between the weight of liquid originally in the bowl and that remaining in the bowl after a dispensing operation is concluded.

Centrally disposed in bowl 10 and extending up to the intended maximum level for the bowl is an overflow pipe 22 having a section 24 of ribbed flexible material capable of longitudinal expansion and contraction. As shown in Figure 2, the overflow pipe 22 may be provided with spiders 26 and 28 disposed on opposite sides of the flexible section 24. Supported on spider 26 is a thermo-responsive element 30 consisting of a bellows-like closed container preferably filled with a liquid whose co-efficient of voluminal expansion will be such, that for any temperature changes the overflow pipe will move in accordance with the variation in depth of the liquid to be dispensed. The element 30, as will be understood, is variable in length in accordance with changes in temperature. The upper or moving end of element 30 is connected by rod 32 to spider 28, so that contraction or expansion of element 30 will result in lowering or raising of the level of the upper end of the overflow pipe 22. Thus, if the liquid is forced into bowl 10 by pump 4 at a low temperature, the overflow pipe will have been automatically shortened to decrease the capacity of the bowl 10, so that only a predetermined weight of the liquid fills the bowl 10, which remains constant at all times, although its volume will vary with temperature changes. The excess liquid overflows out pipe 22. The weight of the liquid in the bowl returns the scale hand 16 exactly to zero position on the dial 18. If the temperature of the liquid in bowl 10 should rise, resulting in an increase in volume of the liquid, the element 30 will increase the length of the overflow pipe 22 an equal amount so that no overflow of liquid can take place, the weight indication remaining "zero". Conversely, if the temperature should decrease, element 30 shortens pipe 22 to the same degree that the liquid contacts.

In Figure 3 is shown a modification of the variable length overflow pipe in which the pipe 22a is provided as before with a flexible section 24a, while the thermo-responsive element 30a is positioned outside and bridging the section 24a. The expansion or contraction of the element 30a accordingly elongates or shortens pipe 22a in accordance with the changes in volume of the liquid in the bowl in response to temperature changes.

In the bottom of bowl 10 is a drain pipe 32 having a valve 34 therein operated by crank 36. The drain pipe 32 disposes the liquid from the bowl into the usual dispensing hose 38.

The overflow pipe 22 or 22a discharges into a conduit 40 which returns the excess liquid to the source of supply. Neither the conduits 8 or 40 nor the dispensing hose 38 are carried by or otherwise contact the bowl 10, thereby avoiding inaccurate registering of the weight of the bowl and fluid. These conduits 32 and 40 are fitted with expansion couplings 42 to permit unrestrained movement of the scale, and similar couplings are provided at 43 between 8 and 10, 32 and 38 and 22 and 40.

In operation, the motor 2 and pump 4 are actuated, thereby forcing liquid into bowl 10, until it overflows through pipe 22. Contact of the liquid with the thermo-responsive element, 30, causes expansion or contraction of the pipe 22, thereby regulating its length in accordance with the temperature. The motor 2 and pump 4 can then be stopped and the liquid in the bowl 10 drains out to the level of the top of pipe 22, the indicator hand 16 being then at "zero" on the dial 18. To dispense liquid, the valve 34 is opened, draining liquid from bowl 10 into and through the dispensing hose 38, the indicator hand 16 at the same time moving counterclockwise around the dial 18 away from zero to register the weight of liquid dispensed.

It will be understood that any desired type of weighing device may be used for weighing the liquid in the bowl, that the capacity of the bowl 10 may be varied by means other than those disclosed and that the device as a whole may have many uses, all falling within the scope of my invention as defined in the following claims.

I claim:

1. In a liquid dispensing device, the combination of a liquid receiving means from which fluid may be dispensed, means for weighing the liquid therein, and means responsive to temperature changes of the liquid for varying the capacity of the receiving means, to compensate for the corresponding volumetric change of the liquid, whereby the weight of the liquid in the receiving means remains constant when the latter is full.

2. In a liquid dispensing device, the combination of a liquid receiving means, means for delivering liquid to the receiving means, means for dispensing liquid therefrom, means for weighing the liquid in the receiving means, and means responsive to temperature changes of the liquid for varying the capacity of the receiving means to compensate for the corresponding volumetric change of the liquid, whereby the weight of the liquid in the receiving means remains constant when the latter is full.

3. In a liquid dispensing device, the combination of a liquid receiving chamber, means for delivering liquid to the chamber, means for dispensing liquid from the chamber, means responsive to temperature changes of the liquid for varying the capacity of the chamber to compensate for the corresponding volumetric change of the liquid, means for weighing the liquid in the chamber, and means for registering the weight of the liquid dispensed from the chamber.

4. In a liquid dispensing device, the combination of a liquid receiving chamber of variable capacity, means for weighing the liquid in the chamber, and means responsive to temperature changes of the liquid for varying the capacity of the chamber to compensate for changes in weight resulting from corresponding volumetric changes.

5. In a liquid dispensing device, the combination of a liquid receiving chamber, means for varying the capacity of the chamber in accordance with temperature changes, means for dispensing liquid from the chamber, and means for indicating the weight of the liquid dispensed from the chamber.

6. In a liquid dispensing device, the combination of a weighing means, a chamber for receiving liquid operatively connected thereto, and an overflow pipe of thermally variable length therein for limiting the volume of fluid in the chamber to compensate for changes in weight thereof due to temperature changes.

7. In a liquid dispensing device, the combination of a liquid receiving means, means for weighing the liquid in the receiving means, an overflow pipe of variable length in the receiving means, and thermally responsive means connected to the pipe for varying its length to compensate for the change in weight of the liquid due to a volumetric change thereof in response to temperature changes.

8. In a liquid dispensing device, the combination of a liquid receiving means, means for weighing the liquid therein, an indicator connected to the weighing means for registering the number of units of measure of fluid dispensed, and thermostatic means for varying the capacity of the liquid receiving means in proportion to the change in volume of the liquid due to temperature variations, whereby the indicator will always be returned to a predetermined position when the chamber is full.

9. In a liquid weighing device, the combination of a weighing means, a chamber supported thereon, and thermally responsive means for varying the capacity of the chamber to compensate for weight changes due to volumetric changes in response to temperature changes.

10. In a liquid weighing device, the combination of weighing means, a chamber supported thereon, and means for varying the capacity of the chamber in proportion to the change in volume of the liquid due to temperature variations.

11. In a liquid dispensing device, the combination of a receptacle of thermally variable capacity, means for delivering fluid to the receptacle, means for dispensing liquid from the receptacle, means for weighing the fluid in the receptacle, and indicating means connected to the weighing means, the indicating means registering zero when the receptacle is full, and moving away from zero in proportion to the amount of fluid dispensed.

12. In a liquid dispensing device, the combination of a weighing means having an indicator, a receptacle of thermally variable capacity supported on the weighing means, means for delivering liquid to the receptacle, and means for dispensing liquid from the receptacle, the indicator registering zero when the receptacle is full and moving away from zero in proportion to the weight of fluid dispensed.

13. In a liquid dispensing device, the combination of a weighing means having an indicator, a receptacle supported on the weighing means, means for delivering liquid to the receptacle, means for dispensing liquid from the receptacle, an overflow pipe of variable length in the chamber, and thermally responsive means connected to the overflow pipe for varying the length of the latter in proportion to variations in volume of the liquid due to temperature changes, the indicator registering zero when the receptacle is full and moving away from zero in proportion to the weight of liquid dispensed.

CHARLES S. HAZARD.